March 3, 1953 W. E. WITHALL 2,630,317
FRICTION SHOCK ABSORBER FOR RAILWAY CAR TRUCKS
Filed Oct. 10, 1949
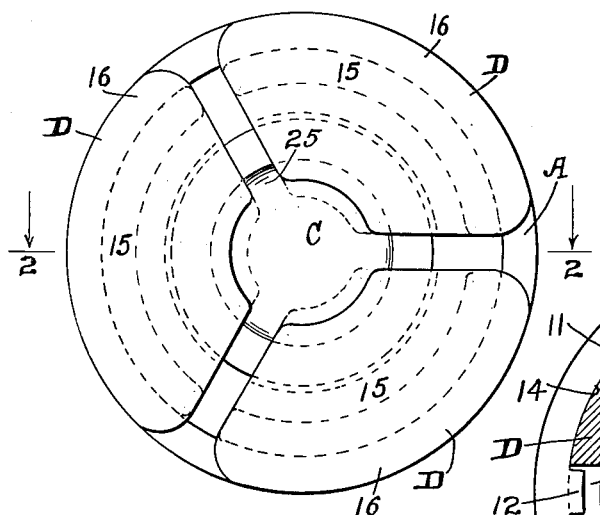
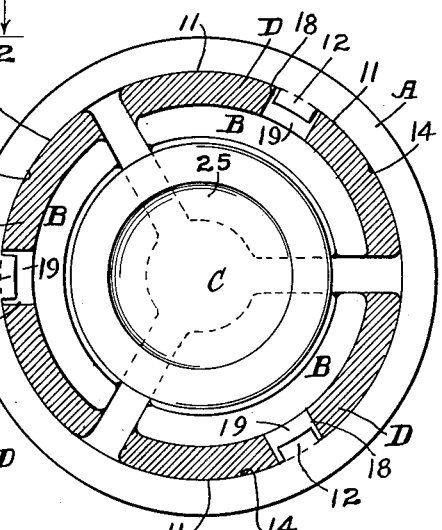
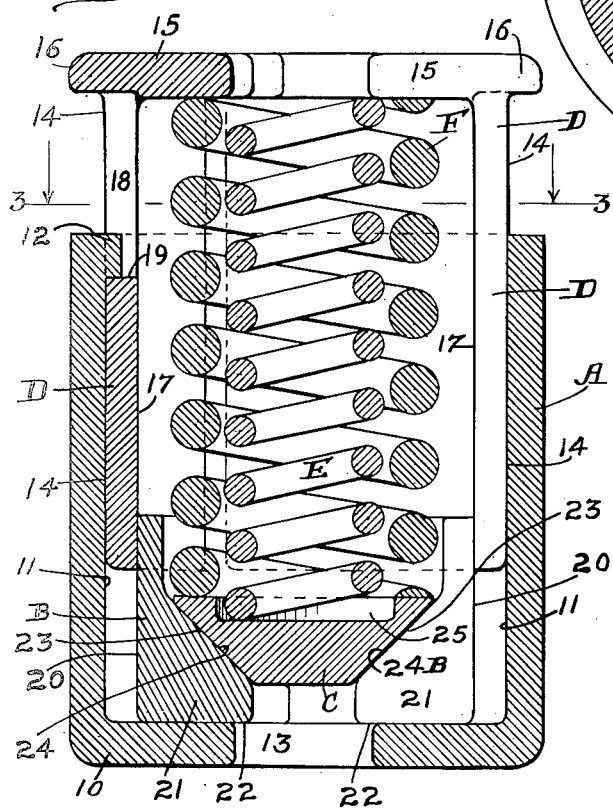
Inventor:
William E. Withall.
By
Henry Fuchs
Atty.

Patented Mar. 3, 1953

2,630,317

UNITED STATES PATENT OFFICE 2,630,317

FRICTION SHOCK ABSORBER FOR RAILWAY CAR TRUCKS

William E. Withall, Hinsdale, Ill., assignor to W. H. Miner, Inc., Chicago, Ill., a corporation of Delaware Application October 10, 1949, Serial No. 120,558

4 Claims. (Cl. 267—9)

This invention relates to improvements in friction shock absorbers for snubbing or dampening the action of railway car truck springs.

One object of the invention is to provide a friction shock absorber for snubbing the action of railway car truck springs, comprising a friction casing, friction elements or plates slidingly telescoped within the casing, friction shoes within the casing engaging the inner sides of the friction elements or plates, wedge means for spreading the shoes apart and forcing the same against the friction elements or plates to press the latter into frictional engagement with the casing, and spring means opposing relative lengthwise movement of the friction elements or plates and the wedge means, and movement of the friction elements or plates inwardly of the casing.

Other objects of the invention will more clearly appear from the description and claims hereinafter following.

In the accompanying drawing forming a part of this specification, Figure 1 is a top plan view of my improved shock absorber, with the springs omitted. Figure 2 is a transverse, vertical sectional view, corresponding substantially to the line 2—2 of Figure 1, including the springs. Figure 3 is a horizontal sectional view, corresponding substantially to the line 3—3 of Figure 2, with the springs omitted.

As illustrated in the drawing, my improved shock absorber comprises broadly a friction casing A, three friction shoes B—B—B, a wedge block C, three friction plates D—D—D, an inner spring E, and an outer spring F.

The casing A is in the form of a tubular member of cylindrical, transverse cross section, open at its top end, and having a transverse bottom wall 10 at its bottom end. The casing presents lengthwise extending, transversely curved, interior friction surfaces 11—11—11, with which the friction plates D—D—D respectively cooperate. At the upper end thereof, the casing A has three circumferentially spaced, inwardly projecting stop lugs 12—12—12, each lug being located centrally of the corresponding friction surface 11. The bottom wall 10 of the casing is provided with a central opening 13, adapted to accommodate the usual spring centering lug of the lower spring plate of a truck spring cluster.

The friction plates D are three in number and are of similar design, the same being arranged symmetrically about the central, vertical axis of the mechanism. Each plate D is of curved, transverse cross section, presenting a longitudinally extending, transversely curved friction surface 14 on its outer side, slidingly engaged with the corresponding friction surface 11 of the casing. Each plate D has an inwardly projecting, horizontal flange 15 at its upper end. Each plate D further has a laterally outwardly projecting flange 16 at its upper end, which overhangs the wall of the casing A and is engageable with the upper end of said wall to limit downward movement of the plate.

The inner side of each plate D presents a lengthwise extending, transversely curved friction surface 17, which is in sliding engagement with the corresponding friction shoe B. Each plate D is also centrally slotted lengthwise, as indicated at 18, to accommodate the corresponding lug 12 of the casing, said slot extending downwardly from the flange 16 of the plate to a point short of midway between the ends of said plate, thereby providing a stop shoulder 19 engageable with the corresponding lug 12 to limit outward movement of said plate.

The friction shoes B are of similar design and correspond in number to the friction plates D, one of the shoes B being engaged by one of the friction plates. Each shoe B has a transversely curved, lengthwise extending friction surface 20 on its outer side, engaged with the inner friction surface 17 of the corresponding plate. Each shoe B is laterally inwardly enlarged at its lower end, as indicated at 21, said enlarged portion presenting a flat bottom face 22, bearing on the upper side of the transverse bottom wall 10 of the casing A. An upwardly facing, transversely curved wedge face 23 is provided on the enlargement of each shoe B, with which the wedge C cooperates.

The wedge C is in the form of a block of frusto-conical shape and presents an annular, downwardly converging wedge face 24 on its outer side, engaging the wedge faces 23—23—23 of the three shoes B—B—B. On the upper side, the block C is centrally recessed to provide a seat 25 for the bottom end of the inner spring E.

The inner spring E is in the form of a helical coil, having its upper end bearing on the underneath sides of the flanges 15—15—15 of the plates D—D—D and its lower end engaged in the seat 25 of the wedge C.

The outer spring F is also in the form of a helical coil and surrounds the coil E. The spring F bears at its top end on the flanges 15—15—15 of the plates D—D—D, and at its bottom end on the wedge C.

The springs E and F are both under initial compression, thereby, through the medium of the wedge C, wedging the shoes B—B—B apart into tight frictional engagement with the plates D—D—D and thus pressing the plates into tight frictional contact with the friction surfaces of the casing A.

In assembling the mechanism, the friction plates D—D—D, shoes B—B—B, wedge C, and springs E and F are inserted within the casing A, as a unit, through the open end of said casing, the plates D—D—D being circumferentially contracted to clear the lugs 12—12—12 at the upper end of the casing. As the assembled unit is pushed into the casing, the shoulders 19—19—19 of the plates pass the lugs 12—12—12 of the casing, permitting the lugs to snap into the slots 18—18—18 to be engaged over said shoulders 19—19—19 and limit outward movement of the plates.

My improved shock absorber is particularly designed to replace one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of the cluster, the plates D—D—D are forced downwardly with respect to the casing A, against the resistance of the springs E and F, compressing the latter and thus forcing the wedge C against the shoes B—B—B to wedge the same apart, against the plates D—D—D, and force the latter into tight frictional engagement with the friction surfaces of the casing A, thereby providing high frictional resistance to snub the action of the truck springs, by sliding movement of the plates on the friction surfaces of the casing and the friction surfaces of the shoes B—B—B.

Upon recoil of the truck springs and upward movement of the top spring plate of the truck spring cluster, the springs E and F return all of the friction plates D—D—D to the normal full release positions shown in Figure 2, outward movement of the plates being positively limited by engagement of the stop shoulders 19—19—19 thereof with the stop lugs 12—12—12 of the casing A.

I claim:

1. In a friction shock absorber, the combination with a friction casing open at one end and closed at the other end by a transverse wall; of a plurality of elongated friction plates slidingly telescoped within the casing, each of said plates having a spring abutment at its outer end, said plates having friction surfaces on their outer and inner sides, said outer surfaces being in sliding frictional contact with the interior of the casing; friction shoes bearing on said transverse wall of the casing, each of said shoes having a wedge face on the inner side and a friction surface on the outer side, said friction surface of each shoe being in sliding engagement with the inner friction surfaces of the corresponding friction plate; a wedge block in wedging engagement with the wedge faces of said shoes; and spring means interposed and reacting between said wedge block and the spring abutments of said shoes.

2. In a friction shock absorber, the combination with a friction casing open at one end and closed at the other end by a transverse wall, said casing having lengthwise extending, interior friction surfaces; of friction shoes abutting said transverse wall of the casing, said shoes having lengthwise extending friction surfaces on their outer sides; a plurality of friction plates slidingly telescoped within the casing, said plates surrounding said shoes and having lengthwise extending friction surfaces on their inner and outer sides, respectively engaged with the friction surfaces of said shoes and casing; a wedge block in wedging engagement with the shoes; and spring means bearing at opposite ends on said wedge block and plates to yieldingly oppose movement of said plates and wedge block toward each other lengthwise of the mechanism.

3. In a friction shock absorber, the combination with a friction casing open at one end and closed at the other end by a transverse wall; of a plurality of friction shoes within the casing bearing on said wall; a plurality of elongated friction plates surrounding said shoes and having sliding frictional engagement with said shoes and with the interior of the casing, said plates projecting outwardly of the casing at the open end thereof; spring abutment means at the outer ends of said plates; a wedge having spreading engagement with said shoes; and spring means within the casing bearing at opposite ends on said spring abutment means and said wedge.

4. In a friction shock absorber, the combination with a friction casing open at its upper end and having a transverse wall at its bottom end, said casing having lengthwise extending, interior friction surfaces; of a plurality of elongated friction plates slidingly telescoped within the casing, said plates having lengthwise extending friction surfaces on their inner and outer sides, the friction surfaces on the outer sides thereof engaging the friction surfaces of the casing, said plates having inturned flanges at the upper ends; a plurality of friction shoes bearing on said transverse wall of the casing, said shoes having friction surfaces on the outer sides engaged with the inner friction surfaces of said plates, said shoes having upwardly facing wedge faces on their inner sides; a block having wedge faces engaging the wedge faces of said shoes; and spring means interposed between said flanges and said block and bearing at its upper end on the flanges of said plates and at its bottom end on said block.

WILLIAM E. WITHALL.

REFERENCES CITED

The following references are of record in the file of this patent:

UNITED STATES PATENTS

| Number | Name | Date |
|--------|------|------|
| 756,919 | Washburn | Apr. 12, 1904 |
| 787,416 | Washburn | Apr. 18, 1905 |
| 1,308,965 | Strid | July 8, 1919 |
| 1,320,563 | Moore | Nov. 4, 1919 |